US010467655B1

(12) United States Patent
Feldman et al.

(10) Patent No.: US 10,467,655 B1
(45) Date of Patent: Nov. 5, 2019

(54) PROTECTED AUDIENCE SELECTION

(71) Applicant: Quantcast Corporation, San Francisco, CA (US)

(72) Inventors: Konrad S. Feldman, San Francisco, CA (US); Damian John Reeves, Menlo Park, CA (US); Paul G. Sutter, Seattle, WA (US)

(73) Assignee: Quantcast Corporation, San Francisco, CA (US)

( * ) Notice: Subject to any disclaimer, the term of this patent is extended or adjusted under 35 U.S.C. 154(b) by 302 days.

(21) Appl. No.: 15/639,830

(22) Filed: Jun. 30, 2017

Related U.S. Application Data

(63) Continuation-in-part of application No. 12/761,327, filed on Apr. 15, 2010, now abandoned.

(51) Int. Cl.
- *G06Q 30/00* (2012.01)
- *G06Q 30/02* (2012.01)
- *H04L 29/08* (2006.01)

(52) U.S. Cl.
CPC ..... *G06Q 30/0255* (2013.01); *G06Q 30/0201* (2013.01); *G06Q 30/0246* (2013.01); *H04L 67/22* (2013.01)

(58) Field of Classification Search
CPC ........................................ G06Q 30/00–30/0284
USPC .............................................. 705/14.1–14.73
See application file for complete search history.

(56) References Cited

U.S. PATENT DOCUMENTS

| | | | |
|---|---|---|---|
| 6,839,680 B1 | 1/2005 | Liu et al. | |
| 7,146,329 B2 * | 12/2006 | Conkwright | G06Q 30/02 705/14.66 |
| 7,685,191 B1 | 3/2010 | Zwicky et al. | |
| 7,949,565 B1 * | 5/2011 | Eldering | G06Q 30/02 705/14.49 |
| 8,438,170 B2 | 5/2013 | Koran et al. | |
| 8,448,057 B1 | 5/2013 | Sugnet et al. | |

(Continued)

OTHER PUBLICATIONS

Animesh, A. et al., "Online Advertisers' Bidding Strategies for Search, Experience, and Credence Goods: An Empirical Investigation," ACM Electronic Commerce, 2005.

(Continued)

*Primary Examiner* — John Van Bramer
(74) *Attorney, Agent, or Firm* — Robin W. Reasoner; Andrea Wheeler

(57) ABSTRACT

Protected audience selection system. Media consumption histories of browsers which have converted are received at a modeling system where targeting of browsers has been disabled by excluding targeting labels. A model is built by determining a frequency of each respective media consumption event among the histories and comparing each determined frequency of a respective media consumption event to a frequency of the respective media consumption event among a population of browsers without the conversion event. The model is sent to a targeting system which excludes conversion events. A description of the conversion event is received at the targeting system. A history of a targetable browser is received at the targeting system. The model is applied to the history of the targetable browser at the targeting system in the absence of records of conversion events. Advertising content is sent to the targetable browser according to a result of applying the model.

20 Claims, 6 Drawing Sheets

(56) References Cited

U.S. PATENT DOCUMENTS

| | | | |
|---|---|---|---|
| 8,468,271 B1 * | 6/2013 | Panwar | G06Q 30/0615 370/469 |
| 8,504,575 B2 | 8/2013 | Koran et al. | |
| 9,183,568 B1 | 11/2015 | Sutter | |
| 2001/0020236 A1 | 9/2001 | Cannon | |
| 2002/0013757 A1 | 1/2002 | Bykowsky et al. | |
| 2002/0022967 A1 | 2/2002 | Ohkado | |
| 2002/0123988 A1 | 9/2002 | Dean et al. | |
| 2003/0074252 A1 | 4/2003 | Chandler-Pepelnjak et al. | |
| 2003/0084452 A1 | 5/2003 | Ryan et al. | |
| 2003/0101451 A1 | 5/2003 | Bentolila et al. | |
| 2003/0171990 A1 | 9/2003 | Rao et al. | |
| 2003/0187741 A1 | 10/2003 | Brown et al. | |
| 2004/0181554 A1 | 9/2004 | Heckerman et al. | |
| 2004/0194128 A1 | 9/2004 | McIntyre et al. | |
| 2005/0187818 A1 | 8/2005 | Zito et al. | |
| 2005/0246231 A1 | 11/2005 | Shkedi | |
| 2006/0026063 A1 | 2/2006 | Collins | |
| 2006/0069616 A1 | 3/2006 | Bau | |
| 2006/0173828 A1 | 8/2006 | Rosenberg | |
| 2006/0242013 A1 | 10/2006 | Agarwal et al. | |
| 2006/0282328 A1 | 12/2006 | Gerace et al. | |
| 2007/0061211 A1 | 3/2007 | Ramer et al. | |
| 2007/0100803 A1 | 5/2007 | Cava | |
| 2007/0150348 A1 | 6/2007 | Hussain et al. | |
| 2007/0225996 A1 | 9/2007 | Haberman et al. | |
| 2007/0239528 A1 | 10/2007 | Xie et al. | |
| 2008/0077494 A1 | 3/2008 | Ozveren et al. | |
| 2008/0086365 A1 | 4/2008 | Zollino | |
| 2008/0086741 A1 | 4/2008 | Feldman et al. | |
| 2008/0103903 A1 | 5/2008 | Flake et al. | |
| 2008/0177600 A1 | 7/2008 | McCarthy | |
| 2008/0222283 A1 | 9/2008 | Ertugrul et al. | |
| 2008/0242279 A1 | 10/2008 | Ramer et al. | |
| 2008/0288310 A1 | 11/2008 | Aaltonen et al. | |
| 2009/0024554 A1 | 1/2009 | Murdock et al. | |
| 2010/0217665 A1 | 8/2010 | Sharma | |
| 2011/0087550 A1 | 4/2011 | Fordyce, III et al. | |
| 2011/0295687 A1 | 12/2011 | Bilenko et al. | |
| 2013/0144901 A1 | 6/2013 | Ho et al. | |

OTHER PUBLICATIONS

Deng, J. et al., "Local Web Advertisement Through Dynamic Active Proxy," IEEE ICME, 2000, pp. 1183-1186.

PCT Application No. PCT/US2007/080858, Filed Oct. 9, 2007, Inventors: Konrad S. Feldman et al.

U.S. Appl. No. 11/784,299, filed Apr. 6, 2007, Inventors: Konrad S. Feldman et al.

U.S. Appl. No. 60/851,027, filed Oct. 10, 2006, Inventors: Konrad S. Feldman et al.

Archive of "Alexa Web Search—About Alexa," www.alexa.com, Alexa, 24 pages, [Online] [Archived by http://archive.org on Jan. 26, 2005; Retrieved on May 12, 2010] Retrieved from the Internet<URL:http://web.archive.org/web/20050126045240/pages.alexa.com/company/index.html>.

PCT International Search Report and Written Opinion, PCT Application No. PCT/US07/80858, dated Feb. 4, 2008, 9 pages.

United States Advisory Action, U.S. Appl. No. 12/761,327, dated Nov. 23, 2012, 3 pages.

United States Office Action, U.S. Appl. No. 12/761,327, dated Mar. 9, 2017, 23 pages.

United States Office Action, U.S. Appl. No. 12/761,327, dated May 5, 2016, 18 pages.

United States Office Action, U.S. Appl. No. 12/761,327, dated Sep. 12, 2014, 15 pages.

United States Office Action, U.S. Appl. No. 12/761,327, dated Sep. 14, 2012, 14 pages.

United States Office Action, U.S. Appl. No. 12/761,327, dated Mar. 29, 2012, 11 pages.

United States Office Action, U.S. Appl. No. 11/784,299, dated Feb. 5, 2014, 16 pages.

United States Office Action, U.S. Appl. No. 11/784,299, dated Aug. 15, 2013, 21 pages.

United States Office Action, U.S. Appl. No. 11/784,299, dated Feb. 3, 2011, 13 pages.

United States Office Action, U.S. Appl. No. 11/784,299, dated May 26, 2010, 15 pages.

* cited by examiner

PROTECTED AUDIENCE SELECTION

CROSS-REFERENCE TO RELATED APPLICATIONS

This application is a continuation-in-part of U.S. Non-Provisional application Ser. No. 12/761,327 entitled "Protected Audience Selection" by Paul G. Sutter, Konrad S. Feldman, and Damian John Reeves, filed on Apr. 15, 2010, which is hereby incorporated by reference in its entirety.

DESCRIPTION OF RELATED ART

Information collected during Internet browsing can be used to select browsers for the delivery of online advertising or customized content. For example, a direct measurement system can collect information associated with individual Internet browser installations used to browse the Internet. When a browser requests content, such as the contents of a publisher's website, the website can provide instructions to the browser to submit a pixel request to the direct measurement system. Using the information received by the direct measurement system in the pixel request from the browser, and optional subsequent actions and/or interactions, the direct measurement system can collect information such as the address (e.g. Universal Resource Locator or URL) of the website visited by the browser, information about the browser installation version, labels such as cookie values, etc. In this way, a browser's visitation history can be accumulated by the direct measurement system, and the accumulated history may be associated with a label.

Some website publishers sell opportunities to expose their audience to advertising content through an exchange. An exchange may notify bidders when an opportunity to send advertising content to a browser becomes available, and pass along the browser's labels, such as cookies, to the bidders. A bidder which has access to accumulated browsing histories may use the labels to locate a browsing history of the opportunity's browser, and decide to target the opportunity's browser according to the browsing history (e.g. decide to bid on the opportunity to send advertising content to the browser according to the browser's history).

Increasingly, there is concern over targeting advertising content and customized content according to the contents of a browsing history, especially when browsers are targeted according to low frequency events. This can be especially true for events which are rare due to concerns of re-identification.

What is needed is a way to usefully analyze rich browsing histories which include histories of website visitation and distinctive, rare or low frequency events, such as conversion events, while addressing consumer privacy concerns.

SUMMARY

Embodiments of the invention include a method, a non-transitory computer-readable storage medium and a system for disabling targeting of browsers according to a distinctive, rare, or low frequency event such as a conversion event while still preserving the event in rich browsing histories for use in building sophisticated targeting models. A modeling system receives a respective history of each of a plurality of browsers, with each history comprising a plurality of media consumption events. Some or all of the histories can also comprise a distinctive, rare, or low frequency event. For the purpose of illustration, a particular conversion event, such as completing the purchase of a particular model of shoe, will be discussed with respect to a distinctive, rare, or low frequency event, but it is understood that other events are suitable for use with the disclosed invention. Information in the modeling system is subject to a modeling system policy which insures that the modeling system is free of targeting labels, such as cookies, effectively disabling targeting of browsers from the modeling system. In an embodiment, targeting labels are purged from the histories before they are stored in the modeling system. Models are built by the modeling system from the histories in storage by determining a relationship between the particular conversion event and one or more other media consumption events, according to how many of the purged histories contain both the conversion event and one or more other media consumption events. The model is sent to a targeting system, which has a targeting system policy that is different from the modeling system data policy. Information in the targeting system is subject to the targeting system data policy which insures that the targeting system is free of the particular conversion event, preventing targeting of a browser according to the presence of the particular conversion event in a browsers history. In an embodiment, a description of the particular conversion event is received at the targeting system and conversion events consistent with the received description are purged from browser histories before they are processed by the targeting system, according to the received description. In an embodiment, the targeting system may receive a request to bid on an opportunity to expose a targetable browser to advertising content and may receive a browsing history of the targetable browser from the targetable browser or another source, such as a direct measurement system. The received model is applied to the history of the targetable browser at the targeting system, an environment which lacks records of the conversion event. The targeting system may take one or more actions according to the results of applying the received model such as: composing a response to a bid request, selecting a bid price, making a bid/no bid decision, selecting an advertising campaign, customizing advertising content for the targetable browser, sending advertising content to the targetable browser, sending a response to bid request, or combinations thereof.

In an embodiment, by constructing the model in the absence of targeting labels (e.g. cookies), information from a conversion event, (e.g. features related to an online purchase of a pair of shoes such as inventory number, color, style, category, price range, country of manufacture, coupon usage, payment type), can be used to inform a rich model constructed in a modeling system without incurring the possibility of using a targeting label to target a browser according to the presence of the conversion event in the browser's history. The model can then be transferred to a targeting system that excludes the conversion event from histories but retains targeting labels. At the targeting system, the received model can be applied to browser histories to inform decisions related to the distribution of content, such as bidding decisions, content selection, content customization, operational decisions for an advertising campaign, etc. Advantageously, the invention enables the effective operation of an advertising campaign while limiting the ability to target a browser according to the presence of the conversion event in their histories.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

Figure (FIG. 1 is a high-level block diagram of a computing environment for an advertising system, in accordance with an embodiment of the invention.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention enable the operation of Internet advertising campaigns according to the occurrence of a particular conversion event while limiting the ability to target a browser according to the presence or absence of the conversion event in the browser's history. According to an embodiment of the invention, information is stored in two separate systems: a modeling system and a targeting system. Each system has its own policy which governs the kind of information which is permitted in the respective system. Browsing histories which include the conversion event, are stored in or are available to a modeling system where rich models can be developed in an environment which does not support targeting (e.g. targeting labels such as cookies are not permitted in the modeling system). The rich models can be transferred to a targeting system which does support targeting (e.g. the targeting system may permit targeting labels, such as cookies), but excludes the conversion event from histories. In the targeting system, a browser cannot be selected according to the existence of the conversion event in the browser's history, thus protecting consumer privacy. However, operating an advertising campaign or selecting customized content according to a result of applying the model to a browser's history in the targeting system is still useful to the advertiser or publisher. Advantageously, advertisers may effectively operate campaigns while at the same time, consumer privacy is protected.

Embodiments of the invention are described below in the context of a real-time bidding (RTB) exchange for opportunities to display content such as advertising content to users through their network-enabled devices such as web browsers. It is noted that similar techniques as those described below can be used in targeting content in the context of other kinds of auctions and exchange systems, for use with browser-based supplemental content or other types of networked media as well. Such techniques are particularly useful where rapid decisions regarding opportunities to expose recipients to content are desirable.

Figure 1:
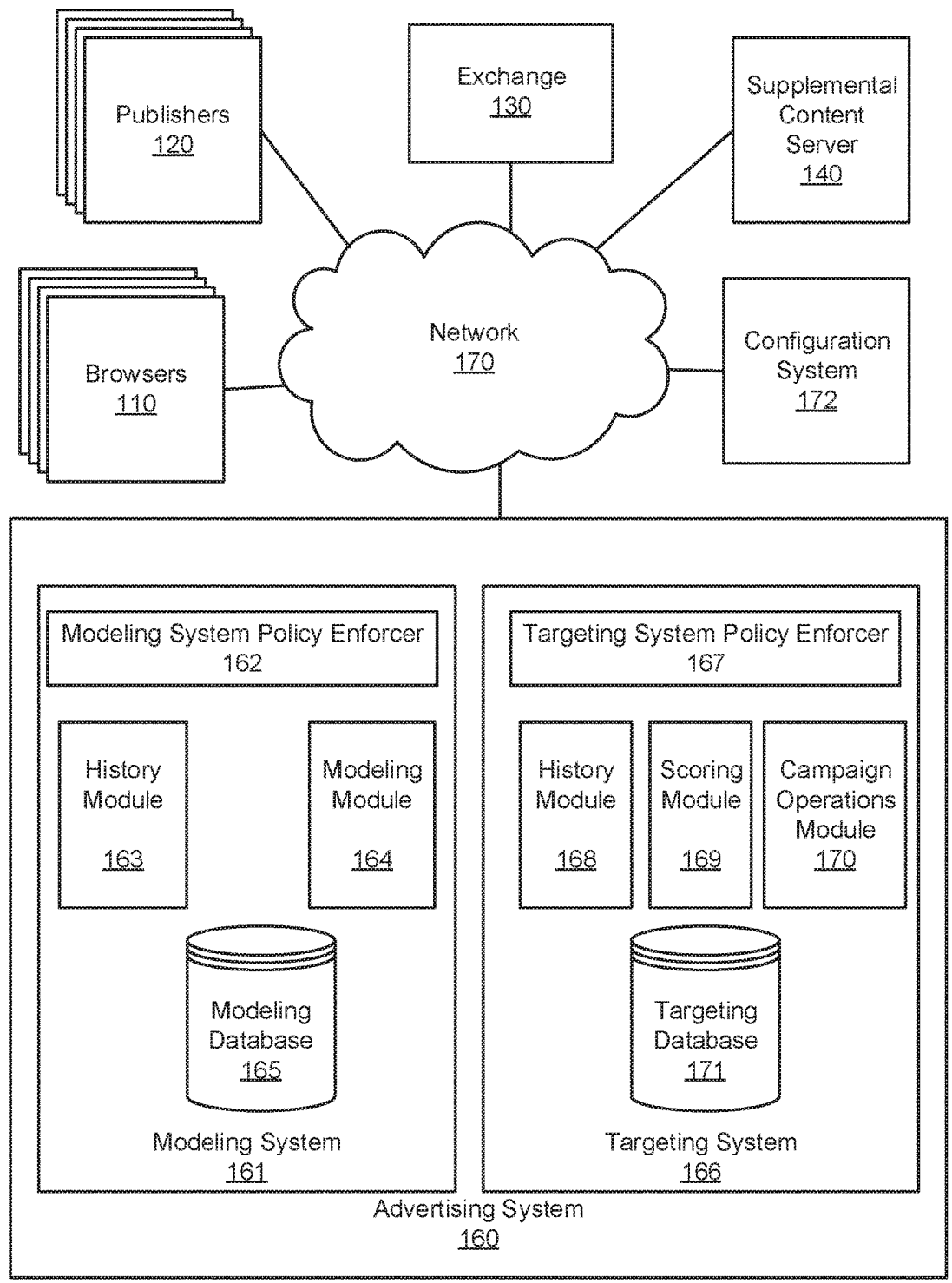

FIG. 1 is a high-level block diagram of a computing environment for an advertising system 160, in accordance with an embodiment of the invention. The computing environment includes recipients such as users' browsers 110, publishers 120, an exchange 130, a supplemental content server 140, and an advertising system 160. These elements are connected by a communications network 170, such as a local area network, a wide area network, a wireless network, an intranet, a cable network, a satellite network, a cellular phone network, an optical network, the Internet or combinations thereof. Although only one exchange 130 and one supplemental content server 140 are illustrated in FIG. 1, the environment can comprise a plurality of exchanges, a plurality of supplemental content servers, or combinations thereof.

A recipient can be an instance of an application such as a user's browser 110 which receives content. A browser 110 can be a web browser executing on a user device, such as a desktop computer or a mobile phone, as the users of those devices browse the web. A recipient can represent a networked consumer and can be a device (e.g. a mobile device, wearable device or a desktop computer) or an instance of an application (e.g. a game or application installed on a cell phone). For example, an application can be executed on a user device, such as a personal computer, laptop computer, tablet computer, smartphone, a specialized hardware gaming device, and a wearable device. A recipient can be associated with one or more targeting labels, such as a first party cookie, a third party cookie, an application tag, or combinations thereof.

Examples of recipients can include software installations or hardware devices used to access content over a network or combinations thereof. Software installations can include a web browser instance, video viewer instance or set-top box software residing on a hardware device. A hardware device can comprise a computer, personal digital assistant (PDA), cell phone, a networked gaming device, an augmented reality (AR) system or set-top unit (STU) such as a STU used in conjunction with cable television service. In some cases, a recipient can represent an individual person, such as an end-user of an application and in other cases a recipient represents a combination of individuals which are logically grouped together, such as but not limited to a family, a household, a social network, a business, a department, or a team, such as a group of end-users sharing software and/or hardware resources.

A targeting label enables a system such as the advertising system 160 to send supplemental content, such as advertising content, to a recipient, such as a browser. For example, a targeting label may be a string such as a cookie value, which can be locally stored by the recipient. In some embodiments, targeting labels can be composed and/or stored remotely from a device associated with a recipient. In some cases, a recipient, such as a browser 110, can have multiple targeting labels, such as multiple first party cookies and multiple third party cookies, which can be used to target the browser 110 by various systems.

Recipients, such as browsers 110, receive content, such as a web page or supplemental content (e.g. text, video, advertising content, etc.), from a publisher 120, such as a website, or other system (e.g. a supplemental content server 140). In some cases, a recipient can also be called a visitor to that publisher (e.g. a website visitor). A publisher 120 sends content to a recipient, such as a browser 110, over a network 170. In some cases, content may be streamed from a publisher 120 to a recipient such as a browser 110. A web page, supplemental content, audio content, video content, multimedia content, advertising content, and downloadable software are examples of content. A browser 110 can receive content from a variety of sources such as a publisher 120, an exchange 130, a supplemental content server 140, and the advertising system 160.

Supplemental content server 140 can send supplemental content, such as advertising content, to recipients, such as browsers 110, on behalf of a sponsor, such as an advertiser. Supplemental content servers which send advertising content are sometimes known as "ad servers". For example, as a user operates browser 110 and navigates to a publisher's website that includes ad slot to be auctioned through an ad exchange 130, the publisher 120 sends instructions to the browser 110 for accessing content to be displayed on the website, including a coded link known as an "ad tag" that points to an exchange 130. The browser 110 uses the ad tag to contact the exchange 130 with a request for supplemental content suitable for the ad slot. The request may comprise information such as: a browser targeting label (e.g. a cookie), a label assigned by the ad exchange 130, an ad slot size (e.g. the dimensions of the ad slot), the type of ad slot (e.g. banner, video), information about the context of the ad slot (e.g. website topic, the URL on which the ad will be delivered), the location of the ad slot within a webpage, or combinations thereof.

The exchange 130 receives the request for the supplemental content from the recipient, such as browser 110, and starts an auction by sending a notification, such as a bid request, to potential bidders of the bidding opportunity. In some cases, information can be included with the bid request such as a targeting label of the recipient which requested the supplemental content (e.g. a browser cookie for the browser which requested supplemental content for an ad slot) and other data describing the bid opportunity, such as, for example, the URL on which the supplemental content will be delivered, the topic of the webpage on which the supplemental content will appear, site visit frequency, the dimensions of the ad slot, information regarding the ad slot's location in the web page (e.g. above the fold, below the fold), or combinations thereof. In some cases, the exchange 130 may maintain or access a mapping which maps labels known to the exchange (e.g. a targeting label assigned by the exchange to a browser 110, a targeting label received at the exchange from the recipient) to targeting labels known to the advertising system 160 (e.g. a third party cookie assigned to a browser 110 by the advertising system 160); in some examples, the exchange 130 may receive a targeting label from the recipient (e.g. browser 110), determine one or more mapped targeting labels from the first targeting label, and send some or all of the mapped targeting labels to the advertising system 160.

Bidders submit their bids ("bid responses") to the exchange 130. The bids can comprise a bid price, one or more targeting labels (e.g. a targeting label received in the bid request, a targeting label selected or assigned by the advertising system), supplemental content, redirection instructions (e.g. instructions to request the supplemental content from a supplemental content server), or combinations thereof. In some cases, a campaign may use multiple supplemental content servers. For example, an array of supplemental content servers may be geographically distributed for load balancing purposes and to address network latency issues. The supplemental content server which is most suitable for the ad slot may be selected and included in the bid. In some cases, redirection instructions may include a targeting label, such as a targeting label received from the exchange, a targeting label received from the recipient (e.g. browser 110), a targeting label set by the advertising system 160, or combinations thereof. The redirection instructions can be configured so that the recipient (e.g. browser 110) sends a targeting label to the advertising system 160 as part of the supplemental content display process (e.g. responsive to receiving the supplemental content, responsive to displaying the supplemental content). For example, this may be accomplished by including a pixel request (e.g. instructions to fetch a pixel from the advertising system) in the supplemental content.

The exchange 130 determines the auction winner from the submitted bids. In some implementations, the supplemental content exchange 130 may send a notification to the auction winner and/or the other bidders. The notification may include an indication of whether the bidder won the auction (e.g. a won bid notification), and may confirm the amount that the winner will be charged for buying the placement, which is some cases is the amount of the second highest bid. In some cases, a notification, such as a won bid notification, can comprise one or more tags or labels such as a browser cookie, a label received by the advertising system 160 in a bid request, and a label assigned or selected by the advertising system 160. In some cases, the exchange 130 sends supplemental content or redirection instructions to the browser 110, and may send one or more tags or labels (e.g. a targeting label such as a browser cookie, a label received by the advertising system 160 in a bid request, and a label assigned or selected by the advertising system 160). The browser 110 can use redirection instructions to request supplemental content. For example, redirection instructions can comprise instructions to request supplemental content from a supplemental content server 140, and the browser 110 can subsequently receive supplemental content from the supplemental content server 140. In some cases, the browser 110 can send a supplemental content server 140 one or more tags or labels received from the exchange 130.

The advertising system 160 comprises two distinct subsystems or modules, each with access to different information: the modeling system 161 (or modeling module) and the targeting system 166 (or targeting module). Information available in the modeling system is governed by a modeling system policy which can be enforced by a modeling system policy enforcer 162. The modeling system policy excludes targeting labels, but permits the presence of histories which include a specified event (such as a conversion event) which can be specified to the advertising system 160 when an advertising campaign is configured. Information accessible by the targeting system 166 is governed by a targeting system policy which can be enforced by a targeting system policy enforcer 167. The targeting system policy excludes one or more specified events from histories, but permits the presence of targeting labels. In an embodiment, the advertising system 160 operates at least one campaign on behalf of an advertiser in a real-time bidding (RTB) environment of an Internet exchange. In some embodiments, the advertising system 160 operates multiple campaigns on behalf of multiple advertisers. In an embodiment, advertising system 160 further comprises a configuration system 172. Configuration system 172 may present a user with a graphical user interface which may be used to configure advertising system 160.

In an embodiment, advertising system 160 can be configured to operate an advertising campaign for an advertiser, such as a shoe advertiser, which is seeking to increase sales.

In this example, the specified event can be a specific conversion event, such as the purchase of a particular model of shoes. In an embodiment, a configuration system 172 may be operated to provide the advertising system 160 with key campaign information such as a description of the specified event. For example, the description of a conversion event of interest (e.g. the online purchase of a particular model of shoes) can be a URL or partial URL of a conversion webpage which is displayed as part of the conversion process. In the modeling system 161, a model can be developed from browser histories having the conversion event (e.g. viewed the webpage "Thank you for purchasing model XYZ shoes" which is sent from the vendor to the browser responsive to the completion of the model XYZ shoe purchase). The model developed in the modeling system 161 can be sent to the targeting system 162 and used by the targeting system 162 to operate an advertising campaign. For example, the model can be applied to a specified browser's history to assess the similarity of the specified browser to browsers which have converted (e.g. have an event in their histories which are consistent with the specified conversion event). The advertising system can take an action according to the results of applying the model to the specified browser's history (e.g. generate a bid response, customize advertising content, select the specified browser to receive advertising content, etc.).

In the example illustrated in FIG. 1, modeling system or module 161 comprises a modeling system policy enforcer 162, a history module 163, a modeling module 164 and a modeling database 165.

The modeling system policy enforcer 162 insures that information in the modeling system complies with the modeling system information policy. In an embodiment, the purpose of the modeling system information policy is to protect recipients from being targeted with online advertising content by the modeling system according to histories received by the modeling system. In an embodiment, the modeling system policy achieves this by excluding targeting labels from the modeling system. An example of a targeting label is a cookie, such as a first party cookie (FPC) or third party cookie (TPC) which can be used to target a browser for receiving advertising content. In an embodiment, the modeling system information policy excludes information which can be used to direct electronic content to a recipient (e.g. an e-mail address), information which can be used to locate a recipient (e.g. a physical address), personally identifiable information (PII), or combinations thereof. Personally identifiable information may include, for example, information related to the ability to contact or locate a living person such as a name, address, or phone number. In an embodiment, the modeling system information policy excludes all personally identifiable information.

In an embodiment, the modeling system policy enforcer 162 can filter information sent to the modeling system 161 according to the modeling system information policy, preventing the modeling system from both using and storing any information which does not comply with the modeling system information policy. In an embodiment, the modeling system policy enforcer 162 may detect information that does not comply with the modeling systems information policy and purge or delete the detected information.

The history module 163 receives histories, such as online media consumption histories of recipients. In an example, the history module 163 may receive browser histories such as website visitation histories and histories of advertising content exposure from a recipient or a system such as a measurement system. For example, when a recipient, such as a browser 110, requests content (e.g. a webpage, video, advertising content) from a content provider such as a publisher 120 or supplemental content server 140, the content provider can provide instructions to the browser to submit a pixel request to a measurement system. Using the information received by the measurement system in the pixel request from the recipient, and optional subsequent actions and/or interactions, the measurement system can collect information associated with the recipient such as an address (e.g. Universal Resource Locator or URL) of a website visited by a browser, information about an application installation version, labels such as cookie values, etc. Measurement system information which is sent to the modeling system's history module is subject to the modeling system policy enforcer. In an embodiment, targeting labels such as cookie values are excluded from the modeling system 161. In an embodiment, the modeling system policy enforcer 162 may replace a targeting label in a history with a different, non-targetable label, such as a hashed targeting label (e.g. a one-way hash applied to the targeting label value) which enables the modeling system 161 to keep a recipient's accumulated history intact while still complying with the modeling system policies. Accordingly, a recipient's media consumption history can be accumulated by a measurement system and the accumulated history may be associated with a non-targetable label inside the modeling system which cannot be used to target the recipient. In an embodiment, the history module can comprise a measurement system, with all information collected by the measurement system subject to the modeling system policies.

The history module 161 receives history data of recipients such as browsing histories (e.g. website visitation history), interaction histories (e.g. website interaction histories, mobile application interaction histories), conversion histories (e.g. records of online purchases), supplemental content histories (e.g. advertising exposure histories), or combinations thereof. The history data can be received directly or indirectly from the recipients, such as browsers 110, from external systems (e.g. a measurement system external to the advertising system 160), collected by a measurement system internal to the advertising system, or combinations thereof. The received data enables the history module 161 to record media consumption events (e.g. a website visit, exposure to supplemental content, an online purchase, video view, a conversion event) in a data store such as database 165 in conjunction with a non-targetable label. Only one instance of database 165 is shown in FIG. 1 for clarity, but in practice, the histories may be stored in a plurality of data stores, such as a distributed network of storage facilities.

Modeling module 164 can construct models by determining a feature set which is most strongly correlated to being in one group of recipients versus being in another group of recipients. In an embodiment, two groups of recipients may be distinguished according to the presence or absence of an event, such as a specified conversion event; for example, a first group may comprise recipients each having the specified conversion event in their respective histories and a second group may comprise recipients which do not have the specified conversion event in their respective histories. In some cases, a feature selected for the feature set may be selected according to the frequency, recency, and/or quality of the feature in the histories of one group of recipients compared to the frequency, recency, and/or quality of the feature in the histories of another group of recipients. For example, considering a feature such as a website visit, a quality can reflect a duration of the visit, viewability of content received during the visit, engagement of the end-user, etc. A model generated by the modeling module 164 can be applied to the history of a specified recipient to assess the similarity of the specified recipient to the recipients from the first group of recipients (e.g. a training set of recipients) with respect to the second group of recipients (e.g. a set of recipients representing a standard or baseline group); for example, the model may generate a score to reflect the similarity. In an example, a score can comprise one or more numerical scores, ratings, categorizations, or combinations thereof. Advantageously, according to an embodiment of the invention, a score can be generated for a specified recipient by applying the model to the specified recipient's history regardless of whether the specified recipient's history was used to construct the model or not.

In an embodiment, a first set of recipients may represent a training set; the first set of recipients can be selected for having some commonality, such as the presence or absence of a common feature in their histories (e.g. a specified conversion event such as a completed purchase, a visit to an advertiser's website, completion of an online registration form, viewing a video for 30 seconds) and the features of the first group can be extracted from the histories of the recipients in the first group.

The features of a group of recipients can be extracted from history data, such as the information received by the history module 163, derived from aggregate data (e.g. census data), received from an external resource, or combinations thereof. The modeling module 164 acquires features of a second group, representing a standard group or baseline group. In some cases, the second group may comprise recipients which are selected for having some commonality, such as the presence or absence of a common feature in their histories (e.g. recipients which did not convert), and the features of the second group can be extracted from the histories of the recipients in the group. In some cases, the recipients from the second group may be selected to represent a baseline group, such as a group of recipients which are representative of the general US Internet population. In an embodiment, there is no overlap between the recipients of the first group and the recipients of the second group. However, in some embodiments, some overlap between the first and second groups may be permitted; for example, a converter group may be very small, a non-converter group may be very large, and the presence of a small number of converters in a much larger group of non-converters may not significantly alter the quality of the resulting model.

The modeling module 164 may use supervised learning algorithms to identify distinctive features for inclusion in the model. Examples of supervised learning algorithms include Support Vector Machines, Neural Nets, Boosting Algorithms, Generalized Linear Models, Naïve Bayes and/or Decision Trees, as well as univariate and multivariate feature selection. The degree of association of a feature with a similarity to a training set with respect to a baseline group can be assessed using statistical hypothesis testing and/or supervised machine learning algorithms exemplified above. For example, features which co-occur with high frequency or high normalized frequency in the training set compared to the baseline group may be selected as significantly associated with similarity to the training set. A feature frequency may be normalized with respect to a frequency of the feature in the baseline group (e.g. the frequency of the feature in the Internet-using population, the US Internet-using population). The weight associated with each feature may be computed by a supervised machine learning algorithm such as Logistic regression, Support Vector Machine, or any other techniques known to those familiar with the art.

In an embodiment, modeling module 164 can construct models which are used in the operation of a campaign such as a conversion model. A conversion model can be applied to a history of a specified recipient to assess the similarity of the specified recipient's history to the histories of known converters. The result of applying a conversion model may be used to estimate or predict the likelihood that the specified recipient will convert. A definition of a conversion may be established for each campaign as an indication of what counts as a success of the campaign. For example, the definition of a conversion for one campaign may be a click-through to a particular website, while the definition of a conversion for another campaign may be a product purchase event, and the definition of a conversion for yet another campaign may be the completion of a registration form. In an embodiment, the definition of conversion is made with reference to an observable media consumption event, such as a website visit or a visit to a "Thank you for purchasing our product" web page which is presented by a sponsor to a converter after the completion of a conversion event (e.g. after completing an online purchase). Thus, by analyzing history data, converters can be distinguished from non-converters. In one variation, a definition of non-converters (e.g., defining non-converters as visitors to a website that did not purchase a product, versus defining a non-converter as not having met the definition of conversion), and/or other attributes (e.g. geographic attributes, computer attributes, or any other type of attributes) may be used to select groups of recipients used in building the model. In an example, a campaign may indicate a geographic area for which a sponsor wants a model for targeting supplemental content to a receptive audience, where only converters and non-converters from that area are used to build a model. Thus, an attribute filter, such as a geo filter, can be applied to the histories used to construct a model, selectively limiting the pool of recipients used to construct a model. Furthermore, when a history of conversion events is available, converters (e.g. recipients which have completed a conversion event) can be distinguished from non-converters (e.g. recipients which have not completed a conversion event).

In an example, a conversion model can be constructed by extracting features from ("featurizing") the histories of a set of converters and featurizing the histories of a baseline set of recipients, such as a set of browsers which are representative the U.S. Internet browsing population. The feature sets may comprise features from the history data which may be found in the modeling database 165, received from another resource (e.g. received from a browser or data provider), or both. In this example, it is possible that a recipient might appear in both the converter and non-converter groups. However, in some embodiments, the modeling module 164 may be configured to prevent the same recipient from being included in both groups (e.g. the same browser cannot be included in the converter and non-converter groups). Then, the modeling module 164 optionally determines which features are most strongly correlated with being a converter or a non-converter, and uses those features to form a model. Advantageously, the models produced by the modeling module 164 can be applied to the histories of recipients which were not used in the creation of the model.

A model developed by the modeling system may be sent to the targeting system 166. Targeting system or module 166 comprises a targeting system policy enforcer 167, a history module 168, a scoring module 169, a campaign operations module 170, and a targeting database 171.

The targeting system policy enforcer 167 insures that information in the targeting system complies with the targeting system information policy. In an embodiment, the purpose of the targeting system information policy is to protect recipients from being targeted with online advertising content according to the presence of a specified event in their histories such as a conversion event. In an embodiment, the targeting system policy achieves this by allowing the presence of a targeting label, such as a cookie, but excluding the records of a specified event (e.g. a conversion event) from the targeting system. For example, a specified event may be a record of a conversion event such as the purchase of a specific pair of shoes from an advertiser. In an embodiment, some or all forms of personally identifiable information may be excluded from the targeting system.

In an embodiment, the targeting system policy enforcer 164 can filter information sent to the targeting system 166 according to the targeting system information policy, preventing the intake or storage of any information which does not comply with the targeting system information policy. In an embodiment, the targeting system policy enforcer 164 may detect information that does not comply with the targeting system information policy and delete or purge the detected information. In an embodiment, the targeting system information policy may receive a description of the specified event, such as a description of a conversion event, from an external system, such as configuration system 172 or from modeling system 161, and delete any reference to the specified event from received histories.

The history module 168 receives histories, such as online media consumption histories of recipients, much like the history model of the modeling system. However, because history module 168 is inside the targeting system 162, it must comply with the targeting system policies but is not required to comply with the modeling system policies. Accordingly, the histories collected by the history module 168, such as browser histories, website visitation histories and histories of advertising content exposure, can be permitted to include a targeting label (e.g. a cookie) but may not include a record of the specified event. In an embodiment, the history module 168 can comprise a measurement system which collects some or all of the histories received by the history module 168. For example, when a recipient, such as a browser 110, requests content (e.g. a webpage, video, advertising content) from a content provider such as a publisher 120 or supplemental content server 140, the content provider can provide instructions to the browser to submit a pixel request to the measurement system. Using the information received by the measurement system in the pixel request from the recipient, and optional subsequent actions and/or interactions, the measurement system can collect information associated with the recipient such as an address (e.g. Universal Resource Locator or URL) of a website visited by a browser, information about an application installation version, labels such as cookie values, etc. Measurement system information which is sent to the targeting system's history module 168 is subject to the targeting system policy enforcer. In an embodiment, targeting labels such as cookie values are permitted in the targeting system 166, but a specified event, such as a specified conversion event, is not permitted in the targeting system 166. In an embodiment, the targeting system policy enforcer 167 may redact a specified event from a history, but leave other portions of the history intact; this enables the targeting system 166 to keep portions of a recipient's accumulated history together while still complying with the targeting system policies. Accordingly, a recipient's redacted media consumption history can be accumulated inside the targeting system 166, and the redacted history may be associated with a targeting label, such as a cookie, which enables the modeling system to select the recipient to receive content such as advertising content.

History module 168 can receive history data of recipients such as browsing histories (e.g. website visitation history), interaction histories (e.g. website interaction histories, mobile application interaction histories), conversion histories (e.g. records of online purchases), supplemental content histories (e.g. advertising exposure histories), or combinations thereof. The history data can be received directly or indirectly from the recipients, such as browsers 110, from external systems (e.g. a measurement system external to the advertising system 160), or both. The received data enables the history module 168 to record media consumption events (e.g. a website visit, exposure to supplemental content, an online purchase, a conversion event) in a data store such as database 171 in conjunction with a targeting label. Only one instance of database 171 is shown in FIG. 1 for clarity, but in practice, the histories may be stored in a plurality of data stores, such as a distributed network of storage facilities.

Scoring module 169 uses one or more models generated by the modeling module 162 (e.g. a conversion model), either individually or in combination, and history information (e.g. received recipient histories, histories retrieved from database 168, information received in a bid request) to generate a score or rating. For example, a conversion model received from the modeling system 161 can be applied to a recipient's history to assess the similarity of the recipient to converters and estimate or predict a recipient's likelihood of conversion.

Campaign operations module 170 operates campaigns on behalf of advertisers. For example, the campaign operations module 170 can purchase or receive opportunities to expose recipients to supplemental content, such as advertising content. Campaign operations module 170 receives bid requests from exchange 130 and generates bids which are sent to the exchange 130. The bids can comprise a bid price, one or more targeting labels associated with the intended recipient of the supplemental content (e.g. a cookie value received in the bid request, a cookie value selected or assigned by the advertising system, etc.), supplemental content, redirection instructions (e.g. instructions to request the supplemental content from a supplemental content server 140), or combinations thereof. To construct a bid response, the campaign operations module 170 may interoperate with the scoring module 169 to determine a score which reflects the similarity of a recipient to a conversion model's converters. For example, this score can indicate the likelihood of conversion of a recipient associated with a bid request. In some cases, a recipient's model score can be determined before a bid request is received. However, in some embodiments, a model score may be determined for a specified recipient responsive to receiving a bid request representing an opportunity to expose the specified recipient to supplemental content. Advantageously, determining a recipient's score responsive to receiving the bid request enables the advertising system 160 to use the most recent information available when determining a similarity or likelihood of conversion, which is especially important for providing some types of supplemental content such as advertising content with respect to short time consideration products and services. In some cases, features of the bid opportunity (e.g. the website where supplemental content will appear) may be incorporated into the model and influence bidding or other operational decisions.

An operational decision (e.g. setting a bid price, deciding to bid, applying a frequency cap, selecting a supplemental content creative, customizing a supplemental content creative, etc.) may be made by the campaign operations module 170 according to a score determined by the scoring module 169. For example, in an embodiment, the advertising system 160 may only bid on bid requests targeting recipients having a score that exceeds a threshold. In another example, a frequency cap may be set according to a threshold score.

In an embodiment, a recipient's likelihood of conversion may be determined and an advertising system 160 may make operational decisions (e.g. setting a bid price, deciding to bid, applying a frequency cap, selecting a supplemental content creative, customizing a supplemental content creative, etc.) according to a configuration. In an embodiment, a configuration may be received from a configurations system 172. For example, configuration system 172 may present an end user with a graphical user interface for configuring an advertising campaign. For example, a description of a specified event (e.g. a conversion event) may be configured via a GUI presented by the configuration system and sent to the modules in the advertising system. Campaign operations information such as budgeting information (e.g. target cost, total budget, budget pacing information), scheduling information (e.g. campaign duration), targeting information (e.g. specification of targeting information such as a geographical restrictions), etc. may be configured through the configuration system 172. Campaign operations module 170 can receive constraints such as budgeting instructions (e.g. total budget, target cost-per-mille (CPM), target spend rate), scheduling instructions (e.g. campaign duration, start date, end date), reach goals, frequency caps, and/or targeting instructions (e.g. demographics, information used to construct a conversion model, score threshold) which can be used to determine which recipients and bid requests are suitable for a particular campaign. The configuration system 172 may present a graphical user interface which can be used to interactively configure, initiate, monitor, and/or adjust campaigns.

Figure 2:
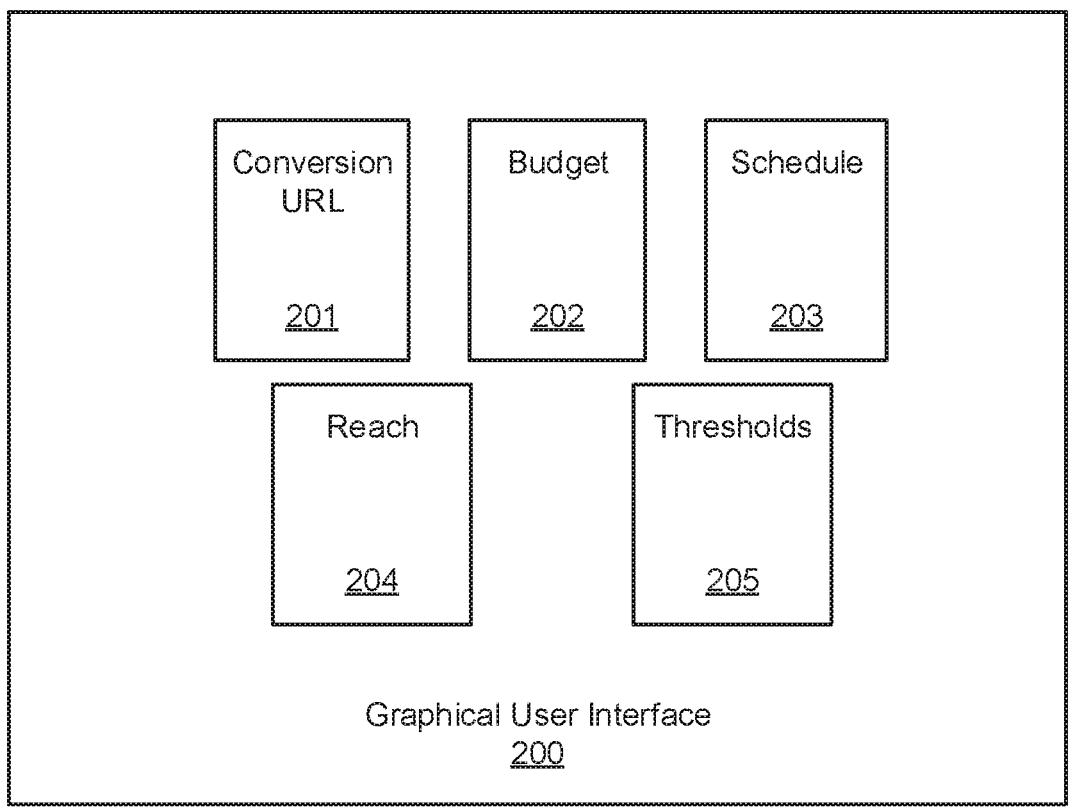
FIG. 2 is an example of a graphical user interface, in accordance with an embodiment of the invention.

FIG. 2 is an example of a graphical user interface (GUI) 200 in accordance with an embodiment of the invention. For example, graphical user interface 200 is an interactive display that may be provided to a campaign operator by the advertising system 160. Graphical user interface 200 may be displayed by configuration system 172, which can comprise hardware and/or software. For example, graphical user interface 200 may be displayed on a computer monitor through a browser or other application operating on a computing device.

Conversion URL pane 201 of graphical user interface 200 can be used to configure a specified event description. For example, a specified event description may comprise a partial or complete conversion page Universal Resource Locator (URL). For example, a URL may describe the webpage which is displayed to a recipient after completing a purchase order, such as: "www.vendorA.com/ThankYou-ForPurchasingItemXYZ.html". In some examples, only a partial URL may be used to enable partial matching; in this case, a specified event description may match multiple similar, but not identical, web pages. For example, a specified event may match a set of closely related products (e.g. a particular model of shoe in all sizes or colors), a vendor's category of products (e.g. soccer cleats), or a category of conversion events (all purchases between $50 and $100 dollars). In an embodiment, the specified event description may comprise a shared tag or shared label which is assigned to converters by the advertiser. In this case, the existence of the shared tag or shared label in a recipient's history can indicate that the recipient is a converter and redacting a conversion event from a recipient's history can comprise removing the shared tag or shared label.

Budget pane 202 of graphical user interface 200 can be used to display or configure an advertising campaign's budget constraints such as target budget, target budget spend rate (e.g. dollars per day), target cost per mille (CPM), target cost per action (CPA), etc. In an embodiment, a campaign operator can configure a campaign by setting parameters in the budget pane which can be relayed to the campaign operations module 170. In an embodiment, budget pane 202 may display the status of a completed or ongoing campaign operated by the advertising system 160 (e.g. budget spent to date, budget remaining, actual spend rate, actual CPM, actual CPA, etc.) and optionally enable the campaign operator to adjust campaign constraints for an ongoing campaign. For example, a target budget, a target spend rate, a target CPM or target CPA for an ongoing campaign may be increased or decreased.

Schedule pane 203 of graphical user interface 200 can display a campaign's scheduling constraints such as start date, end date, campaign duration, etc. In an embodiment, a campaign operator can configure a campaign by setting parameters in the schedule pane 203 which can be relayed to the campaign operations module 170. In an embodiment, schedule pane 203 may display the status of a completed or ongoing campaign operated by the advertising system 160 (e.g. elapsed time since beginning of campaign, remaining time to end of campaign, etc.) and optionally enable the campaign operator to adjust campaign constraints for an ongoing campaign (e.g. suspend a campaign, prematurely halt a campaign, extend a campaign, etc.).

Reach pane 204 of graphical user interface 200 can display a campaign's audience constraints such as target number of uniques, target demographics, geographic constraints, etc. For example, target demographics can comprise a fraction or number of recipients meeting a target demographic profile described by one or more demographic features such as gender, age range, education level, etc. In an embodiment, a campaign operator can configure a campaign by setting parameters in the reach pane 204 which can be relayed to the campaign operations module 170. In an embodiment, reach pane 204 may display the effective reach of a completed or ongoing campaign operated by the advertising system 160 (e.g. number of uniques exposed to date, demographics of exposed recipients) and optionally enable the campaign operator to adjust campaign constraints for an ongoing campaign (e.g. adjust a target number of uniques, adjust demographic profile, enable or disable campaign delivery to geographic regions etc.).

Threshold pane 205 of graphical user interface 200 can display a campaign's thresholds such as target thresholds for scores. For example, a model can be applied to a specified recipient's history in the targeting system 166 according to a model developed by the modeling system 161, resulting in a score or rating. The results of applying the model (e.g. one or more scores, ratings or categories) can be compared with a target threshold in order to make operational decisions such as restricting or disabling targeting of recipients which are not similar enough to the population used to create the model, setting frequency caps, selecting a bid price, etc. Threshold pane 205 of graphical user interface 200 can display a campaign's threshold configuration, statistics on the scores of recipients reached by the campaign to date (e.g. an aggregate score of the reached recipients), or both.

Figure 3:
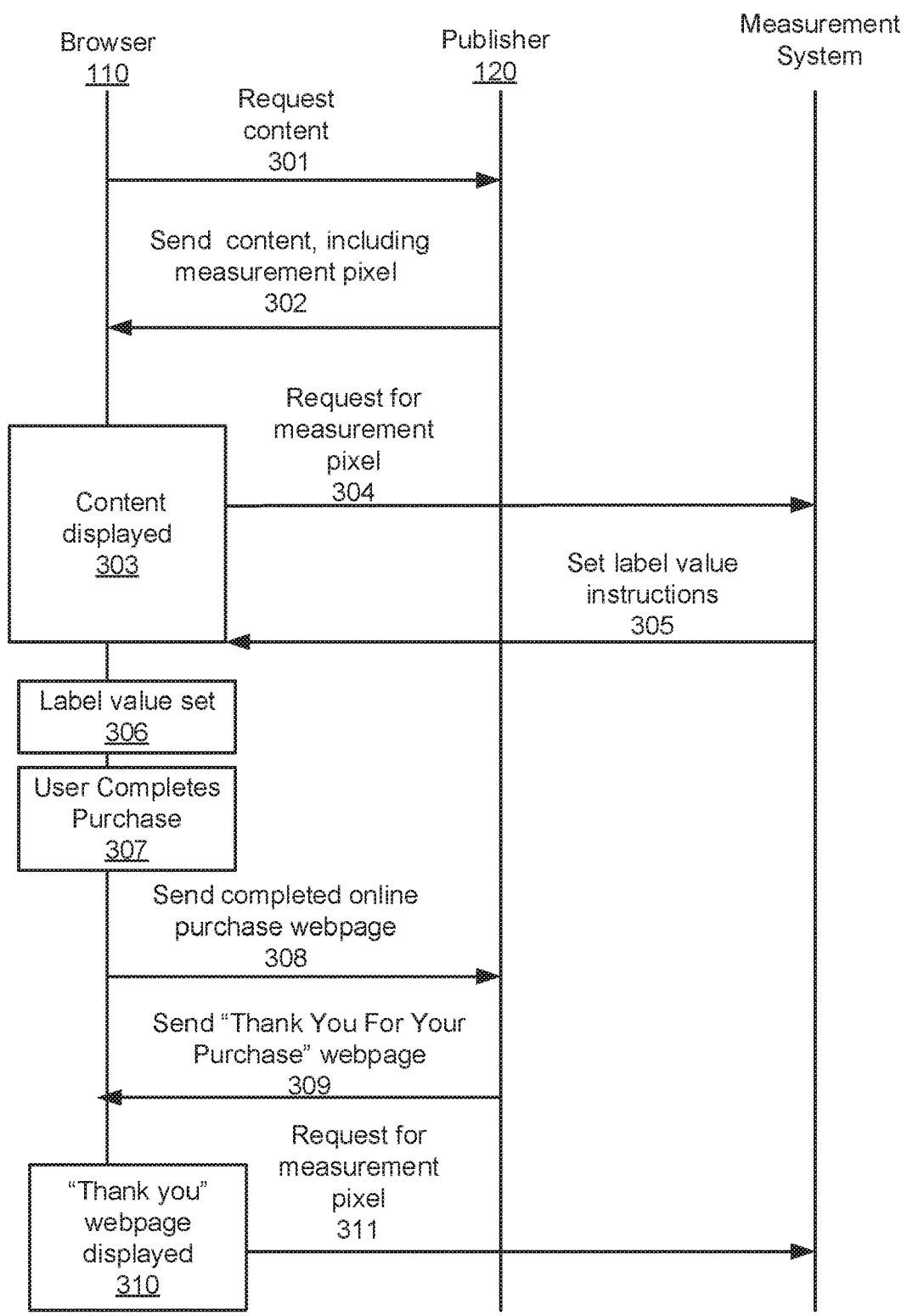
FIG. 3 is an interaction diagram illustrating a flow of information, in accordance with an embodiment of the invention.

FIG. 3 is an interaction diagram illustrating a flow of information, in accordance with an embodiment of the invention. It is noted that FIG. 3 is merely illustrating an example of the operation of a measurement system and the interactions depicted in FIG. 3 may vary in other examples. In an embodiment, history module 163, history module 168 or both may comprise a measurement module. In some embodiments, advertising system 160 may comprise a measurement module which sends histories to history module 163, history module 168, or both. In some embodiments, a measurement module external to advertising system 160 may be coupled to network 170 and send histories to advertising system 160, history module 163, history module 168, or combinations thereof.

In the scenario illustrated in FIG. 3, as a user operates browser 110 and navigates to a publisher 120. In this example, publisher 120 is an online vendor which sells goods or services through a website. In this example, the vendor is publishing content (e.g. an online shoe catalog, a sequence of web pages that enable an online purchase products) through a website. In step 301, browser 110 requests content from a publisher. In this case, the browser navigates to a webpage that will enable the user to see shoes for sale. The browser 110 requests the webpage 301 from the publisher 120.

In step 302, the publisher provides content comprising the webpage creative which includes a measurement instruction, such as a measurement pixel, to the browser. In this example, the measurement instruction directs browser 110 to request some content such as a pixel (e.g. a "clear GIF" or invisible pixel) from a measurement system.

In step 303, the browser 110 displays the received content. The browser 110 displays the received content.

In step 304, the measurement instruction directs the browser request content a measurement pixel (e.g. a "clear GIF" or invisible pixel) from the measurement system. The request can comprise information such as the URL of the webpage, one or more labels (e.g. cookies), information about the browser (e.g. browser version), time zone, etc. In FIG. 3, steps 303 and 304 are shown to occur in sequence, however in embodiments, some or all of steps 303 and 304 may be executed in parallel (e.g. the measurement pixel may be requested before all of the content received from the publisher has finished rendering in the browser 110).

In step 305, the measurement system sends instructions to the browser 110 to set a label value (e.g. set a third party cookie value). In an example, the measurement system can look at the information received in the request for a measurement pixel and determine if a label, such as a cookie, has been set at browser 110. In the event that a label has not been set, the measurement system can send instructions to the browser 110 to set a label, such as a cookie value. The measurement system can record information (e.g. URL of webpage visited, timestamp, labels) received in the request for measurement pixel in conjunction with a label, such as a cookie value, if it is permitted, thereby collecting a browser history for the browser. Note that a measurement system which is internal to the modeling system 161 cannot set or receive a targeting label according to the modeling system policy, so a measurement system which is internal to a modeling system may instead collect a browser history in conjunction with a tag or label, such as a hashed label which can no longer function as a targeting label (e.g. a targeting label that has been subject to a one-way hash function). Similarly, a measurement system which is internal to the targeting system 162 may not collect a history having a specified event (e.g. the specified conversion event); in the case where a specified event is described by a URL which matches the URL of the webpage requested by the browser in step 301, then a measurement system internal to targeting system 162 would not be able to collect that URL in a history.

In step 306, a label (e.g. a targeting label) is set at the browser 110 according to the instructions sent to the browser 110 in step 305.

In step 307, the user takes an action, such as filling out a form through the browser 110, to complete a purchase. In an example, this action may comprise providing payment information, providing shipping instructions, selecting a "buy" button to confirm the purchase, or combinations thereof.

In step 308, the completed online purchase webpage is sent to the publisher 120.

In step 309, the publisher sends content such as a "Thank You For Your Purchase" webpage, which includes a measurement pixel.

In step 310, the "Thank You For Your Purchase" webpage is displayed at the browser 110.

In step 311, a request for a measurement pixel is sent from the browser to the measurement system. The request may comprise the targeting label which was set in step 306. Where permitted, this can allow the measurement system to accumulate a visitation history in conjunction with a targetable label.

In the example interaction illustrated in FIG. 3, the conversion event was a website purchase which was completed by the user in step 308, and confirmed by the publisher in step 309. However, there are many other types of conversion events. For example, for some campaigns, a conversion event may comprise filling out a registration form, viewing a full video, or clicking through a link which could be confirmed by the publisher in other ways (e.g. a "thank you for registering" web page). In embodiments of the invention, a description of a conversion event can be the URL of a webpage which is only displayed when the conversion event has occurred, such as the full or partial URL of a "Thank You For Your Purchase" webpage. In an embodiment, the advertising system 160 may comprise one or more measurement systems and may accumulate browser histories in a history module 163 which are subject to the modeling system policies, browser histories in a history module 168 which are subject to the targeting system policies or both. In some embodiments, histories of the same browser may be permitted in both the modeling system 161 and the targeting system 166 (e.g. a browser's history having a conversion event but lacking targeting labels may be stored in history module 163, a history of the same browser which has a targeting label but lacks a conversion event may be stored in history module 168). In some embodiments, the advertising system 160 may not permit histories of the same browsers in both the modeling system 161 and the targeting system 166. In an embodiment, a measurement system may receive information and send filtered information to the advertising system 160 (e.g. to a history module 163, history module 168, or both). For example, a measurement system may send histories without targeting labels to modeling system 161 and/or send histories without conversion events to targeting system 166. In an embodiment, a measurement system may receive information and send unfiltered information to the advertising system 160 (e.g. to a history module 163, history module 168, or both) and rely on the modeling system policy enforcer 162 and/or targeting system policy enforcer 167 to enforce the appropriate system policies.

Figure 4:
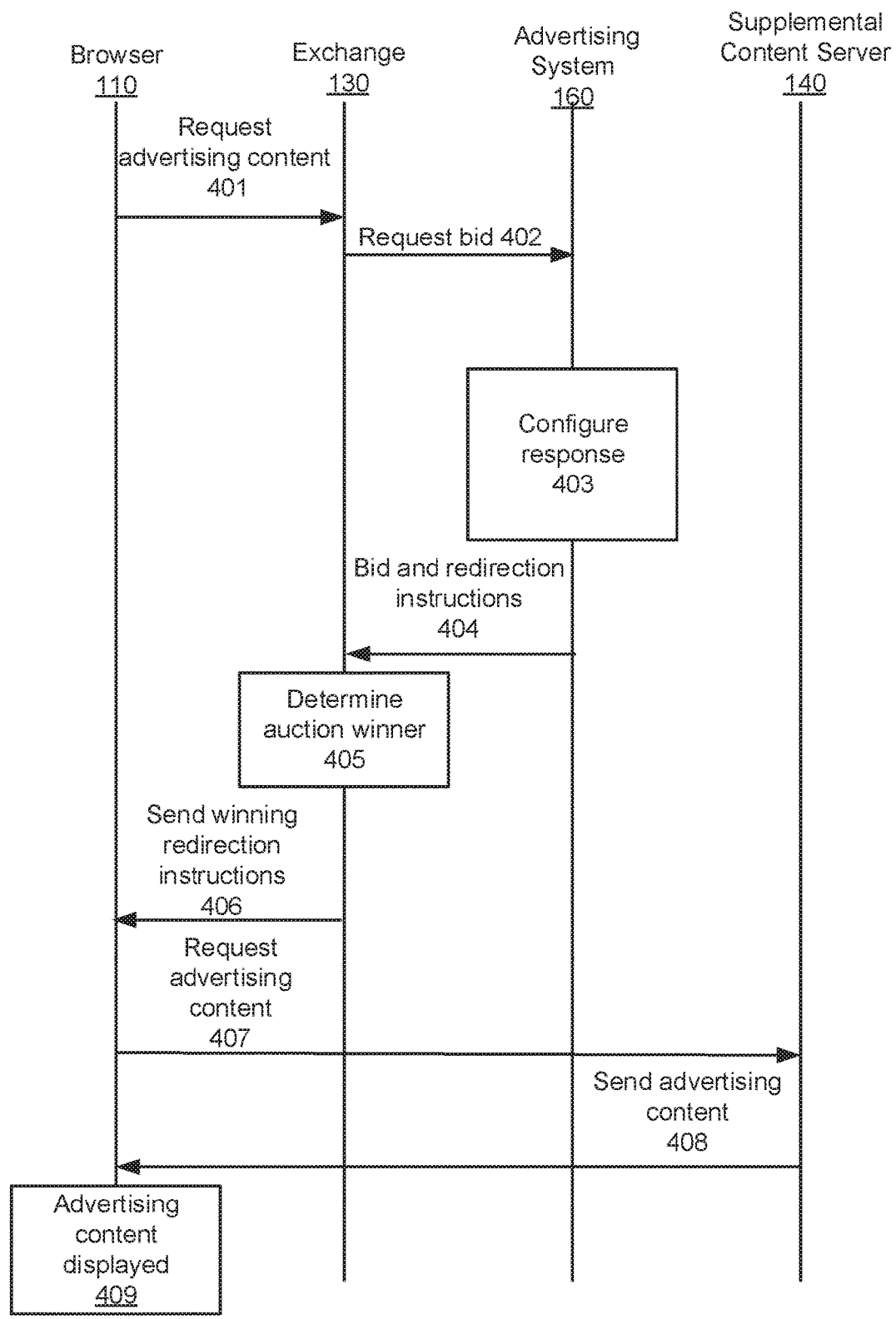
FIG. 4 is an interaction diagram illustrating a flow of information, in accordance with an embodiment of the invention.

FIG. 4 is an interaction diagram illustrating a flow of information, in accordance with an embodiment of the invention. It is noted that FIG. 4 is merely illustrating an example of a real-time bidding environment, and the interactions depicted in FIG. 4 may vary in other examples.

In the scenario illustrated in FIG. 4, as a user operates browser 110 and navigates to a publisher's website 120 that includes an ad slot to be auctioned in an exchange 130, the publisher's web server sends instructions to the browser 110 for accessing content to be displayed on the website, including a coded link known as an "ad tag" that points to an exchange 130. The browser 110 uses the ad tag to contact the exchange 130 with a request for a supplemental content, such as advertising content, in step 401. In some cases, one or more labels can be sent by the browser in step 401 such as a targeting label or an application label. For example, the browser may send a label previously set by the exchange 130 (e.g. an exchange cookie).

The exchange 130 receives the request for the supplemental content from the browser 110 and reads the label. In response, the exchange starts the auction by sending a bid request to the advertising system 160 in step 402 and to other servers to notify potential bidders of the bidding opportunity. Included with the bid request is a label (e.g. label such as a cookie set by exchange 130 or a mapped label) and other information describing the bid opportunity, such as, for example, the URL on which the supplemental content will be delivered, the topic of the webpage on which the supplemental content will appear, site visit frequency, and/or the dimensions of the ad slot. In an embodiment, a bid request may have an expiration, which indicates a time or elapsed time beyond which responses to the bid request will no longer be considered by the exchange. For example, the expiration may be communicated to the bidders with a general guideline which references a timestamp sent with the bid request (e.g. a time stamp indicating the time a bid request was sent from the exchange may be sent with each bid request, and the exchange may stop accepting bid responses for consideration 300 milliseconds after that timestamp), with an absolute timestamp (e.g. a timestamp indicating the time a bid request will expire is sent with each bid request), or by other methods.

In step 403, the advertising system 160 receives the bid request from the exchange 130 and configures a response. For example, the advertising system may generate a response to the bid request. In an embodiment, the bid request is directed to the targeting system 166. A history of the browser 110 can be retrieved. For example, a history of browser 110 may be available through the history module 168, which may retrieve the history from a targeting database 171. The browser's history can be assessed according to a model received from the modeling system 161. For example, a score may be generated by scoring module 169. In an embodiment, scoring module may determine a score, at least in part, according to features of the bid opportunity (e.g. the topic of the webpage on which the supplemental content will appear, dimension of ad slot, the exchange offering the bid opportunity, etc.).

In an embodiment, the browser's history may be assessed according to a plurality of models. For example, in an embodiment, multiple models may be developed to assess a browser's history according to different criteria. For example, a first conversion model may be developed to assess the similarity of a browser to converters which purchased a fashionable dress shoe and a second conversion model may be developed to assess the similarity of a browser to converters which purchased a sports shoe. In an embodiment, each model may be applied to a browser's history, and the relative values of the resulting scores may be used to inform the configuration of a bid or response. In some cases, modeling system 161 may develop multiple models for the same conversion event. For example, converters may be grouped or clustered and a conversion model may be developed for each group. For example, a set of converters may be grouped according to a feature such as the presence or absence of an event in a browser's history, a demographic feature (e.g. by inferred age range of the converter), derived feature (e.g. lifetime value of purchases by the converter), or combinations thereof. In an embodiment, each model may be applied to a browser's history, and the relative values of the resulting scores may be used to inform the configuration of a bid or response.

In an embodiment, an advertising system 160 may operate a plurality of advertising campaigns on behalf of a plurality of different advertisers. In this case, one or more models may be developed for each of the different advertisers. A browser's history may be assessed according to a plurality of different models, and the resulting scores may be used to inform the selection of a particular advertising campaign and the subsequent configuration of a bid or response.

In an embodiment, the bid response can comprise a bid price which is selected according to one or more scores. In some cases, information received from the exchange 130, a targeting label selected or assigned by the advertising system 160, or combinations thereof may be selected for inclusion with the bid. A bid may further comprise supplemental content or instructions for accessing supplemental content from a supplemental content server 140 which can be sent to the browser 110 should the bid win the auction. The instructions comprise instructions for directing the browser to a supplemental content server 140 that will serve the supplemental content for the winning bid. In some cases, the advertising system 160 may choose not to bid, and may not respond to the request for bid, or provide a response to exchange 130 comprising a "no bid" message. In an embodiment, configuring a bid response can comprise selecting or customizing an advertising creative according to one or more scores. For example, if a first model for an advertising campaign was constructed using budget conscious converters (e.g. converters which used a coupon to purchase goods), and a second model for an advertising campaign was constructed using high value converters (e.g. converters which purchased multiple items at the same time, converters which did not use a coupon, etc.), and the results of applying both models to a browser's history indicate that the browser is more similar to a budget-conscious converter (e.g. relatively high score for the first model) than it is to the high value converter (e.g. relatively low score for the second model), then the bid response may be configured to include advertising content comprising a coupon. In an example, the advertising content may be customized according to the score(s). For example, the bid response may comprise advertising content which includes a coupon, with the value of a coupon customized according to the model score(s).

In step 404, the bid is sent from the advertising system 160 to the exchange 130. In this example, the bid comprises a bid price and supplemental content redirect instructions (e.g. instructions for requesting supplemental content from a supplemental content server 140).

In step 405, the exchange 130 determines an auction winner from the submitted bids.

In step 406, the exchange 130 sends the instructions included with the winning bid to the browser 110. For example, these instructions can comprise instructions for accessing the supplemental content from supplemental content server 140.

The winning browser 110 requests the supplemental content in step 407, according to the instructions received from the exchange 130.

In step 408 the supplemental content is sent from the supplemental content server to the browser 110.

The supplemental content can be displayed on the browser in step 409. The supplemental content, the instructions or both can be instrumented with instructions which cause the recipient (e.g. browser 110) to send an exposure notification to the advertising system 160. For example, the exposure notification can be a pixel request, which can include one or more labels such as the browser's targeting label.

In some implementations, the process illustrated in steps 401 through 409 of FIG. 4 can be executed in a few seconds. Ideally, the time passage between the browser 110 requesting the supplemental content in step 401 and the end user viewing the supplemental content as it is displayed in step 409 is short enough not to impact the user's enjoyment of the publisher's website that the user is browsing. In other words, there is no noticeable lag to download and display the appropriate ad of the winning bidder in the auction. In the environment of a real time bidding exchange (RTB), the passage of time between steps 402 and 404 can be measured in milliseconds. Ideally, the response to a bid request is received by the RTB exchange while the auction is still accepting responses (e.g. before the bid request expires), leaving the bidder with a very narrow time slice for completing step 403 (configuring a response) and sending the response to the exchange before the bid request expires.

Figure 5:
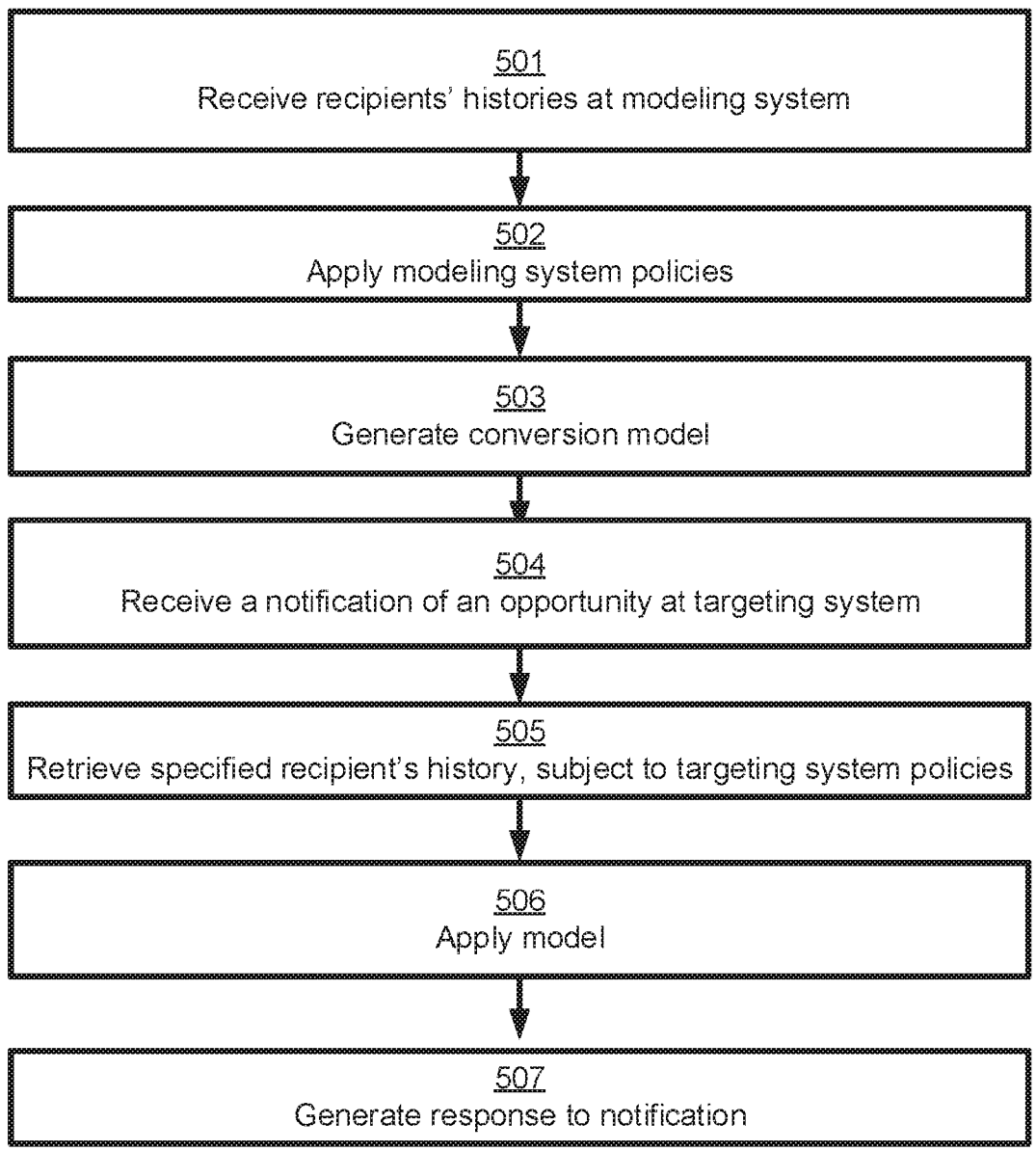
FIG. 5 is a flow chart illustrating a method of controlling a campaign, in accordance with an embodiment of the invention.

FIG. 5 is a flow chart illustrating a method of controlling a campaign, in accordance with an embodiment of the invention. In some implementations, the steps are performed in an order other than the order presented in FIG. 5, and in other implementations, additional or alternative steps may be performed.

In step 501, recipients' histories are received by the advertising system 160. In an example, the recipients are browsers and a plurality of the histories each comprise a specified event such as a conversion event for an advertiser's product. For example, the conversion event may comprise receiving content from a publisher, such as an advertiser. In an example, the conversion event may be recorded in the history as the a partial or complete URL of a webpage which is sent from the advertiser to a recipient responsive to a recipient's conversion (e.g. a webpage stating "Thank you for purchasing product X"). The advertising system may further receive a description of the specified event (e.g. a partial or complete URL), targeting information, or other campaign information from the advertiser such as campaign budget information. In some cases, histories of recipients which do not include the specified event may also be received by the advertising system 160. For example, if the specified event is a conversion event, the histories of non-converters may also be received by the advertising system 160. In some cases, statistics about aggregate audiences (e.g. census information) may be received by the advertising system 160.

In step 502, the advertising system 160 applies modeling system policies to received histories. In an embodiment, modeling system policies prevent the development of a model from histories having the specified event (e.g. converter histories) in the presence of targeting labels. In an embodiment, modeling system policies further prevent the ability to target a converter by excluding personally identifiable information (PII). In an example, converter histories are directed to the modeling system 161 where the modeling system policy enforcer 162 prevents the intake of targeting labels. In an embodiment, modeling system policy enforcer may receive converter histories and redact or remove targeting labels before the converter histories are provided to the history module 163 or stored in the modeling database 165. In an embodiment, a new label may be assigned to each converter history, such as a one-way hash of the respective converter's label(s), so a cohesive history may be maintained for each converter, despite the absence of targeting labels.

In step 503, a model, such as a conversion model, is generated by the advertising system 160. A conversion model can be applied to a specified recipient's history to assess the similarity of the specified recipient's history to the histories of the set of converters used to construct the model. In an example, the assessed similarity can be used to predict a likelihood of conversion. The conversion model can be constructed by comparing the histories of recipients which converted to the histories of recipients which did not convert. In an example, a conversion model may be constructed by determining a feature set for inclusion in the conversion model according to a strength of correlation between each feature in the feature set and having a status of converter compared to having a status of non-converter. In an embodiment, the model is constructed by the modeling system 161, where the converter histories are subject to the modeling system policies (e.g. targeting labels are excluded, no PII).

In an embodiment, the histories of recipients which are used to construct a conversion model may be carefully selected to enable estimation of a likelihood of conversion given certain conditions or for a particular audience. For example, a conversion model which predicts the sensitivity of recipients to supplemental content exposure (e.g. advertising exposure) may be created by comparing the histories of recipients which have received supplemental content and converted to the histories of recipients which received supplemental content and did not convert. In an example, for an advertising campaign which is limited to a specific geographic region (e.g. California only), a conversion model may be constructed by selecting converters which were located in the specific geographic region at the time of conversion, and ignoring the histories of converters which were located outside of the specific geographic region at the time of conversion.

In step 504, a notification of an opportunity to expose a specified recipient to supplemental content is received at the advertising system 160. A notification can comprise a bid request received from an exchange, such as exchange 130, which can send the bid request to the advertising system 160 responsive to receiving a request for supplemental content from the specified recipient, such as browser 110. The notification can comprise a targeting label, such as a cookie.

In step 505, advertising system 160 retrieves a history of the specified recipient, subject to targeting system policies. A measurement system may have accumulated a history of the specified recipient, such as a browsing history. In an embodiment, the history may be requested from a resource external to the advertising system 160 (e.g. a measurement system external to the advertising system, from a resource internal to the advertising system (e.g. history module 168, targeting database 171) or combinations thereof. In an embodiment, the retrieved history of the specified recipient is accessed by the targeting system 166, which is subject to the targeting system policies. In an example, the targeting system policy enforcer 167 can enforce the targeting system policy. For example, the advertising system 160 may have received a specified event description in step 501; the targeting system policy may exclude events which correspond to the received specified event description from histories. In an embodiment, specified events may be redacted from the retrieved history of the specified recipient at the advertising system 160.

In step 506, a model is applied to the retrieved history. In an embodiment, a conversion model received by the targeting system 166 from the modeling system 161 is applied to the history of the recipient specified in the notification at the targeting system 166 responsive to receiving the notification. Because information in the targeting system 166 is subject to the targeting system policies (e.g. no records of events which correspond to the received specified event description are permitted in the targeting system), recipients are not targetable from the targeting system 166 according to the presence or absence of the specified event in their histories. In an example, the targeting system policy enforcer 167 may redact any events which correspond to the received specified event description.

In step 507, a response to the notification is generated according to a result of applying the model to the retrieved history. The advertising system 160 can make operational decisions such as decide to respond to the notification (e.g. a bid/no bid decision), select a bid price, select a frequency cap, select supplemental content, customize supplemental content, or combinations thereof, according to a result of applying the model to the history of the specified recipient. In an example, this can mean making an operational decision according to a score or rating generated by the model. Constraints such as a threshold score or threshold rating can be used to make operational decisions for a campaign. In an example, a high frequency cap or high bid price may be selected for a recipient having a score which reflects a history which is very similar to the histories of converters. In an example, a response to the notification can comprise selecting a supplemental creative (e.g. advertising creative), generating a customized supplemental creative, or both, according to a result of applying the model. The response can be sent to an exchange 130, a recipient 110, a supplemental content server 140, a publisher 120, or combinations thereof.

Physical Components of a Computer

Figure 6:
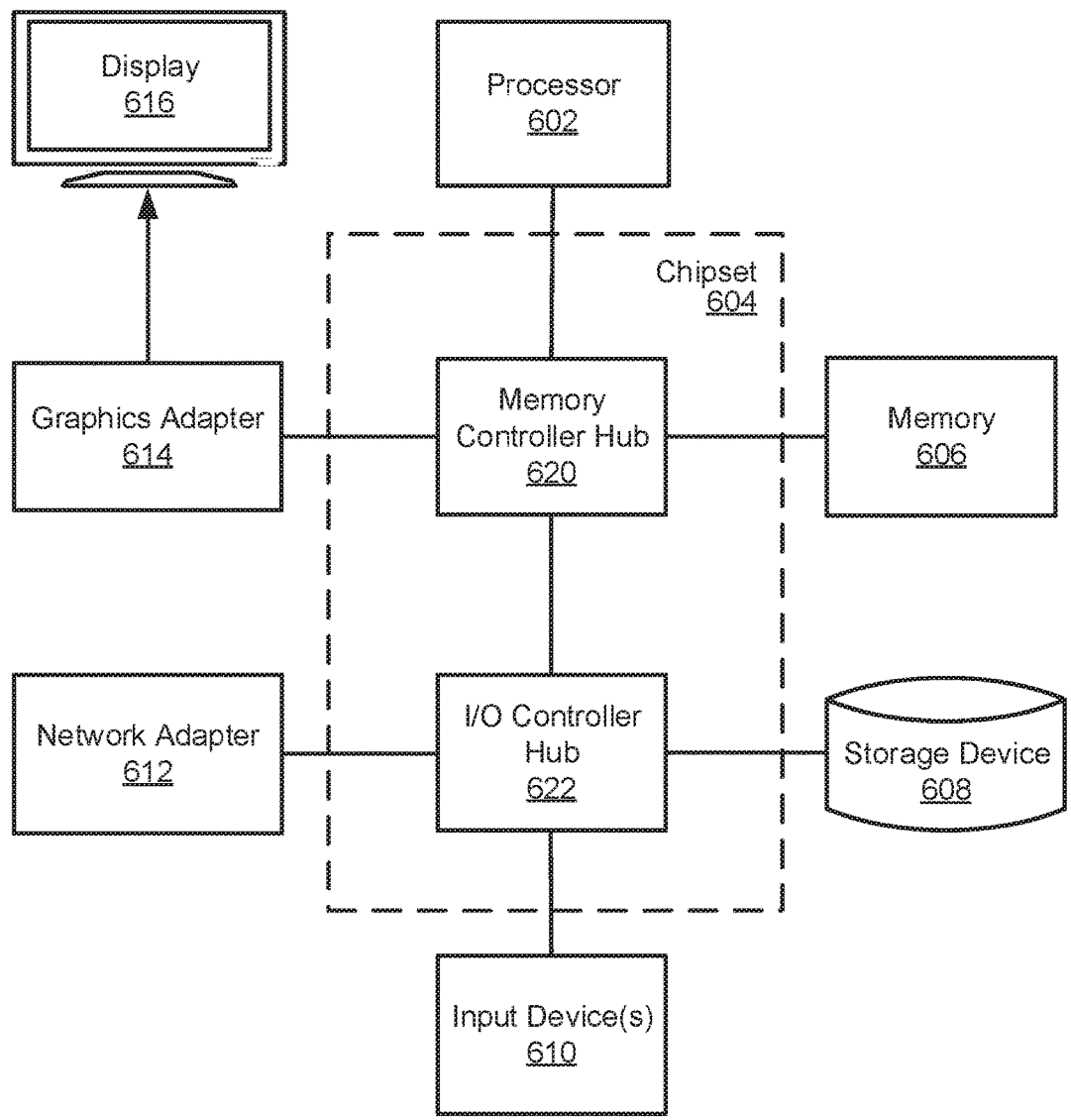
FIG. 6 is a high-level block diagram of the components of a computing system for use, for example, as a browser, a publisher, an exchange, a supplemental content server, a configuration system, or an advertising system depicted in FIG. 1, in accordance with an embodiment.

FIG. 6 is a high-level block diagram of the components of a computing system 600 for use, for example, as a browser 110, a publisher 120, an exchange 130, a supplemental content server 140, a configuration system 172, or an advertising system 160 depicted in FIG. 1, in accordance with an embodiment. Illustrated are at least one processor 602 coupled to a chipset 604. Also coupled to the chipset 604 are a memory 606, a storage device 608, input device(s) 610, a network adapter 612, and a graphics adapter 614. A display 616 is coupled to the graphics adapter 614. In one embodiment, the functionality of the chipset 604 is provided by a memory controller hub 620 and an I/O controller hub 622. In another embodiment, the memory 606 is coupled directly to the processor 602 instead of the chipset 604.

The processor 602 is the hardware logic circuitry of the computer 600 that processes instructions such as computer programs to operate on data. The memory 606 holds instructions and data used by the processor 602. The storage device 608 is any non-transitory computer-readable storage medium, such as a hard drive, compact disk read-only memory (CD-ROM), DVD, or a solid-state memory device. The input devices(s) 610 may be a keyboard, mouse, track ball, touch-sensitive screen and/or another type of pointing device to input data into the computer 600. The network adapter 612 couples the computer 600 to a network. The graphics adapter 614 displays images and other information on the display 616.

As is known in the art, a computer 600 can have different and/or other components than those shown in FIG. 6. In addition, the computer 600 can lack certain illustrated components. In one embodiment, a computer 600 acting as a server may lack an input device 610, a graphics adapter 614, and/or a display 616. Moreover, the storage device 608 can be local and/or remote from the computer 600 (such as embodied within a storage area network (SAN)).

As is known in the art, the computer 600 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602. The functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed is:

1. A computer-implemented method comprising:
   receiving, at a modeling system, a respective history of each of a plurality of browsers, each history comprising a plurality of media consumption events and a conversion event;
   disabling targeting of browsers from the modeling system according to a modeling system data policy which excludes targeting labels from the modeling system, by removing targeting labels from the histories before storing the histories in a storage;
   building a model, by the modeling system, comprising:
      determining a frequency of each respective media consumption event among the histories in the storage; and
      comparing each determined frequency of a respective media consumption event to a frequency of the respective media consumption event among a population of browsers without the conversion event;
   sending the model to a targeting system, the targeting system having a data policy which excludes conversion events from the targeting system;
   receiving, at the targeting system, a description of the conversion event;
   receiving, at the targeting system, a history of a targetable browser;
   purging all conversion events from the history of the targetable browser according to the data policy of the targeting system;
   applying the model to the purged history of the targetable browser at the targeting system; and
   sending advertising content to the targetable browser according to a result of applying the model.

2. The method of claim 1, further comprising:
   receiving a bid request from a real time bidding exchange, the bid request comprising a notification of an opportunity to expose the targetable browser to advertising content;
   and wherein:
   applying the model is responsive to receiving the bid request.

3. The method of claim 2, wherein sending advertising content comprises:
   configuring a bid response with respect to the bid request according to a result of applying the model before the bid request expires.

4. The method of claim 1, wherein:
   the conversion model is generated without the specified browser's history.

5. The method of claim 1, further comprising:
   presenting a graphical user interface to a user, the graphical user interface comprising a user control for setting a threshold for the result of applying the model; and
   receiving the threshold set by the user through the graphical user interface.

6. The method of claim 5, wherein sending comprises:
   sending advertising content to the targetable browser if the result of applying the model satisfies the threshold.

7. The method of claim 1, wherein sending advertising content comprises:
   selecting advertising content according to a result of applying the model.

8. The method of claim 1, wherein sending advertising content comprises:
   customizing advertising content according to a result of applying the model.

9. The method of claim 1, wherein:
   the data policy of the modeling system excludes personally identifiable information from the modeling system.

10. The method of claim 1, wherein:
    the targeting label comprises a cookie.

11. The method of claim 1, further comprising:
    the targeting label comprises a cookie set by the targeting system.

12. A non-transitory computer-readable storage medium executing computer program instructions for operating an advertising campaign, the computer program instructions comprising instructions for:
    receiving, at a modeling system, a respective history of each of a plurality of browsers, each history comprising a plurality of media consumption events and a conversion event;
    disabling targeting of browsers from the modeling system according to a modeling system data policy which excludes targeting labels from the modeling system, by removing targeting labels from the histories before storing the histories in a storage;
    building a model, by the modeling system, comprising:
       determining a frequency of each respective media consumption event among the histories in the storage; and
       comparing each determined frequency of a respective media consumption event to a frequency of the respective media consumption event among a population of browsers without the conversion event;
    sending the model to a targeting system, the targeting system having a data policy which excludes conversion events from the targeting system;
    receiving, at the targeting system, a description of the conversion event;

receiving, at the targeting system, a history of a targetable browser;
purging all conversion events from the history of the targetable browser according to the data policy of the targeting system;
applying the model to the purged history of the targetable browser at the targeting system; and
sending advertising content to the targetable browser according to a result of applying the model.

13. The medium of claim 12, wherein sending advertising content comprises:
receiving a bid request from a real time bidding exchange, the bid request comprising a notification of an opportunity to expose the targetable browser to advertising content;
and wherein:
applying the model is responsive to receiving the bid request.

14. The medium of claim 13, wherein sending advertising content comprises:
configuring a bid response with respect to the bid request according to a result of applying the model before the bid request expires.

15. The medium of claim 12, wherein the medium further comprises instructions for:
presenting a graphical user interface to a user, the graphical user interface comprising a user control for setting a threshold for the result of applying the model; and
receiving the threshold set by the user through the graphical user interface.

16. The medium of claim 12, wherein sending comprises:
sending advertising content to the targetable browser if the result of applying the model satisfies the threshold.

17. A system comprising:
a processor;
a computer-readable storage medium storing processor-executable computer program instructions for operating an advertising campaign, the instructions comprising instructions for:
receiving, at a modeling module, a respective history of each of a plurality of browsers, each history comprising a plurality of media consumption events and a conversion event;
disabling targeting of browsers from the modeling module according to a modeling module data policy which excludes targeting labels from the modeling module, by removing targeting labels from the histories before storing the histories in a modeling module storage;
building a model, at the modeling module, comprising:
determining a frequency of each respective media consumption event among the histories in the modeling module storage; and
comparing each determined frequency of a respective media consumption event to a frequency of the respective media consumption event among a population of browsers without the conversion event;
sending the model to a targeting module, the targeting module having a data policy which excludes conversion events from the targeting module;
receiving, at the targeting module, a description of the conversion event;
receiving, at the targeting module, a history of a targetable browser;
purging all conversion events from the history of the targetable browser according to the data policy of the targeting module,
applying the model to the purged history of the targetable browser at the targeting module; and
sending advertising content to the targetable browser according to a result of applying the model.

18. The system of claim 17, wherein sending advertising content comprises:
receiving a bid request from a real time bidding exchange, the bid request comprising a notification of an opportunity to expose the targetable browser to advertising content;
and wherein:
applying the model is responsive to receiving the bid request.

19. The system of claim 17, wherein sending advertising content comprises:
configuring a bid response to the targetable browser according to a result of applying the model before the bid request expires.

20. The system of claim 17, wherein the instructions further comprises instructions for: presenting a graphical user interface to a user, the graphical user interface comprising a user control for setting a threshold for the result of applying the model; and receiving the threshold set by the user through the graphical user interface; and wherein sending comprises: sending advertising content to the targetable browser if the result of applying the model satisfies the threshold.

* * * * *